Patented Nov. 18, 1952

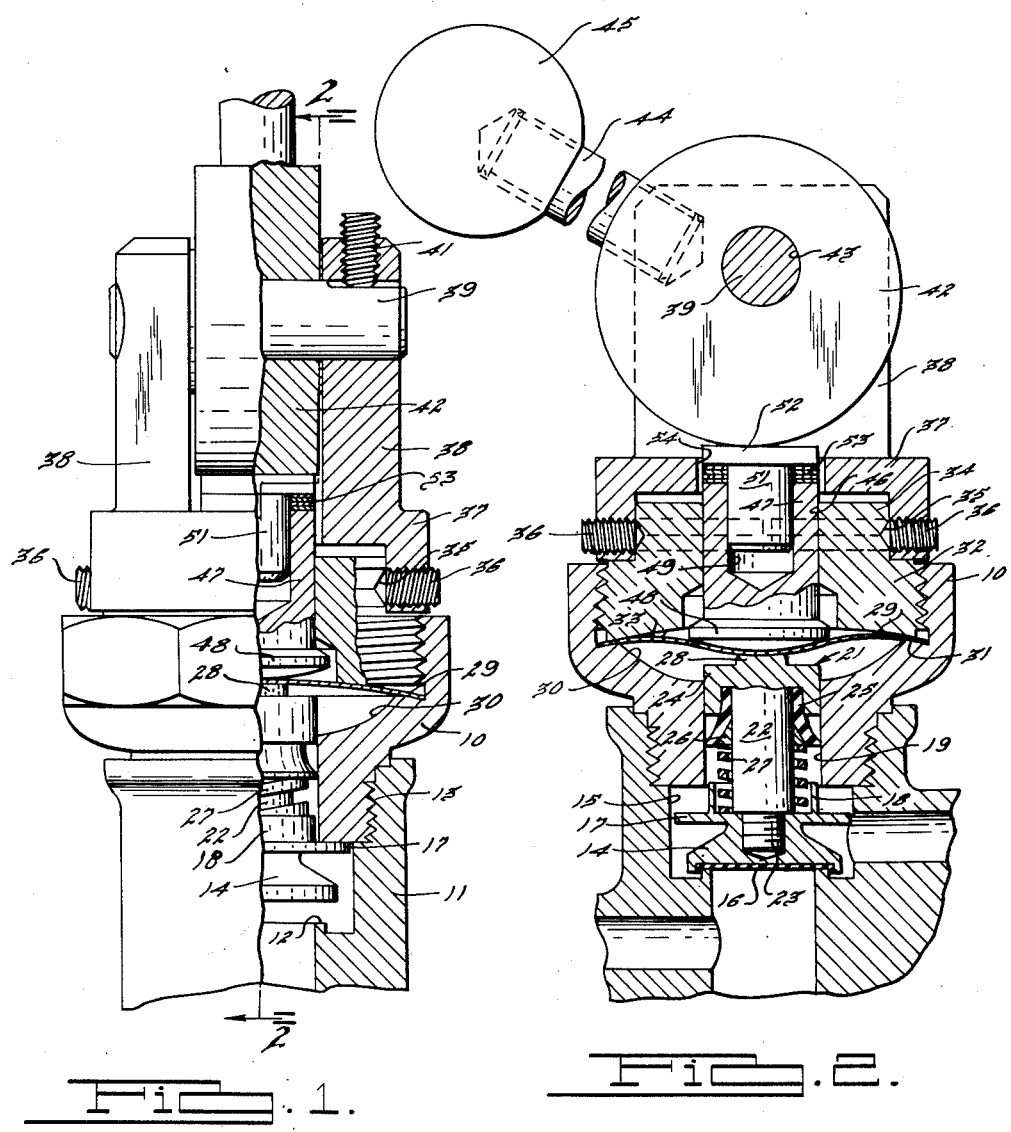

2,618,458

UNITED STATES PATENT OFFICE 2,618,458

CAM ACTUATED VALVE

Carl R. Fosbender, Tecumseh, Mich., assignor to Tecumseh Products Company, Tecumseh, Mich., a corporation of Michigan Application September 24, 1947, Serial No. 775,803

2 Claims. (Cl. 251—132)

This invention relates to a cam operating mechanism for a valve and to a valve operated by a cam mechanism.

The valve of the present invention is of the cam operated type for controlling the flow of gas and liquids under substantial pressure through a conduit. The valve is sealed to prevent the escape of the liquids and gases through the operating mechanism. The valve element is actuated to closed position when a projecting handle on the cam is pulled downwardly by the operator. The valve element is moved to open position by the pressure in the conduit when the handle is moved upwardly.

Where a large number of valves are employed, requiring constant opening and closing in a predetermined sequence, considerable effort and time are expended when the valves are of the screw type. Such valves as those employed on a charging board for a refrigeration unit require continuous opening and closing as one unit after another is charged and the board set up for a charging operation. The closing and opening of the valves is very fatiguing to the operator and considerable time is expended for turning the valve handles to valve closed and open positions.

When the valve of the present invention is substituted for the screw type valves, the operator is relieved of the fatigue attending the operation of the screw type valves and substantial time is saved. The body of the valve may be of conventional form having a seat and a passageway below and above the seat sealed by a spring-pressed valve element having a gasket on its seating face. A diaphragm, conventionally employed upon such types of valves, seals the fluid passageway from the operating elements. A fitting is employed for engaging the peripheral edge of the diaphragm and providing a shoulder to which a cap is secured in such manner as to rotatably adjustable thereon for moving the operating handle into its most advantageous position for operation. Upwardly extending standards on the cap support a cam which is preferably a cylindrical element having its axis offset any amount from $\frac{1}{32}''$ to $\frac{1}{8}''$ or more and having a rod extending therefrom with a ball or similar type of handle by which the cam is moved to and from camming position. A plunger is mounted on the axis of the fitting having a head engaging the diaphragm and having a cylindrical opening in the upper end. A cam engaging plate has a boss extending therefrom which projects within the hollow interior of the plunger, and a plurality of annular washerlike shims are provided, the sides of the head having openings through which the plug may be inserted for regulating the combined length of the cam engaging plate and the plunger. By this means the exact amount of movement is provided to the valve and to the operation of the cam element. When the valve has been installed in a fluid circuit, the cap may be adjusted on the fitting to move the operating handle into the most advantageous operating position and thereafter secure it in position. When the handle is pulled down, the cam operating on the plate moves the plunger downwardly which, operating through the diaphragm, moves the valve downwardly upon its seat. By employing the shims the cam is substantially moved to its maximum operative position so that the pressure of the valve cannot release the cam which positively retains the valve on its seat. When the valve is moved to open position, the upward movement of the handle permits the pressure on the under side of the valve to move the valve upwardly and thereby open the circuit therethrough. Very little force and effort are required of the operator to actuate the valve to open and closed positions.

Accordingly, the main objects of the invention are: to provide a valve for positively sealing a circuit of fluid under pressure which is cam operated; to provide a cam for positively sealing a valve in seated position which operates through a plunger and cam engaging plate, the overall length of which may be regulated by employing a plurality of shims therebetween; to provide a valve having a valve element forced downwardly on a seat by mechanism supported on a fixture secured to the valve body; to provide a fixture attachable to a valve body for supporting a cap containing standards between which a cam is supported in position to operate a plunger having a cam engaging plate thereon which is adjusted relative to the plunger by a plurality of shims, and, in general, to provide a valve which is moved to open and closed position by the application of a pulling or pushing force on the handle which positively seals the passageway for the fluid and which is simple in construction and economical of manufacture.

Other objects and features of novelty of the invention will be specifically pointed out or will become apparent when referring, for a better understanding of the invention, to the following description taken in conjunction with the accompanying drawing, wherein:

Figure 1 is a broken view, partly in section and partly in elevation, of a valve embodying features of this invention, shown in open position, and Fig. 2 is a sectional view of the valve illustrated in Fig. 1, taken on the line 2—2 thereof, with the valve shown in closed position.

In the figures, a valve body 10 is illustrated, having a portion 11 containing a valve seat 12 secured thereto through the engaging threads 13. A valve element 14 is disposed in a cylindrical aperture 15 in the body portion 11 having a recessed sealing gasket 16 on the bottom face. A flange 17 extends outwardly from the element 14 substantially into engagement with the wall of the aperture 15. An annular flange 18 extends upwardly from the flange 17 substantially into engagement with a cylindrical aperture 19 extending through the body 10.

An operating element 21 extends within the aperture 19 having a stud 22 which is secured to the valve 14 by the threaded end 23. The upper end of the stud is provided with a head 24 which substantially engages the wall of the aperture 19 and which receives a sealing element 25 about the stud 22 made of rubber, neoprene or like material. The element 25 has a downwardly extended lip which is expanded outwardly into sealing engagement with the wall of the aperture 19 by a cam element 26 urged upwardly by a spring 27 disposed about the stud 22 within the annular flange 18. The top of the cap 24 contains a boss 28 engaging a diaphragm 29 made of a single or a multiple layer of metal which rests upon a convex shoulder 31 within an aperture 30 in the body portion 10. A fitting 32 is threaded into the end of the aperture 30 having a concave surface 33 on the under side which engages the top surface of the diaphragm and clamps it against the shoulder 31 on the body 10.

The upper end 34 of the fitting is of cylindrical form, having an annular groove 35 in the periphery for receiving the ends of screws 36. The screws 36 extend inwardly from the wall of a cap member 37 which is retained thereon by the screws 36 after being rotated relative thereto into a desired position. The cap 34 has two upwardly directed spaced standards 38 through which a shaft 39 extends and is secured against rotation by a setscrew 41 engaging a flat portion on the shaft, as illustrated in Fig. 1.

The shaft supports a cylindrical cam element 42 having an aperture 43 which is offset from the peripheral edge a predetermined amount depending upon the amount of cam action desired to be obtained through the operation of the cam. The cam element has a rod 44 extending therefrom and provided with a ball 45 on its outer end. The rod and ball form a handle by which the cam is operated to and from valve open and closed positions. An aperture 46 is provided through the center of the fitting 32 in which a plunger 47 is retained for vertical movement. A head 48 on the bottom of the plunger engages the diaphragm 29 to be in operative relation with the boss 28 on the upper part of the movable valve unit. An aperture 49 is provided in the upper end of the plunger 47 in which a boss 51 extending from a cam-engaging plate 52 is inserted. The cam-engaging plate is spaced from the plunger by a plurality of washerlike shims 53 by which the overall length of the plunger and cam plate may be accurately adjusted. The plunger and cam plate project upwardly through the aperture 54 in the cap 37 into engagement with the periphery of the cam element 42.

After the valve has been installed, the setscrews 36 are loosened so that the cap 37 may be adjusted angularly about the center of the valve to move the handle to the most advantageous point for operation. The setscrews 36 are then tightened to retain the cap in adjusted position. A number of the washerlike shims 51 may be installed between the cam-engaging plate 52 and the plunger 47 to have the overall length thereof such that the valve will be closed when the cam element is moved toward its full cam position. Preferably the valve is closed when the cam element is moved to within 30° of full cam position so that additional camming area will be available for operating the valve element 14 to closed position even though wear occurs on the gasket, seat or cam.

In Fig. 2 the valve is shown in closed position, with the handle pulled downwardly toward horizontal position. When it is desired to open the valve, it is only necessary for the operator to strike the knob 45 with the heel of his hand to move the cam out of camming position and the hand to substantially vertical position. This permits the pressure below the valve to raise the valve to open position. When it is desired to close the valve, it is only necessary for the operator to grasp the knob 45 and return it to the position illustrated in Fig. 2. Thus, in an approximately 60° movement of the handle 45, the valve element 14 is moved to open and closed positions. When only a very slight opening of the valve element is required, the offset relation of the center of the cylinder cam element 42 and that of the shaft 39 may be as small as $\frac{1}{32}''$. When a $\frac{1}{8}''$ opening, such as that illustrated in Fig. 1, is desired, approximately $\frac{1}{8}''$ offset of the centers will permit this amount of movement.

Fluid under pressure below the valve is prevented from escaping from the body 10 by the sealing element 25 and also by the diaphragm 29. From actual operation the valve has proved very successful in providing a positive seal for the fluid under pressure and a substantial saving in time and effort necessary for its operation. The saving is especially noted where a large number of valves are employed on a charging board for refrigeration units, as pointed out hereinabove, where the operator is constantly turning off and on the valves in a predetermined sequence.

What is claimed is:

1. The combination with a valve having a main valve body containing a seat and a valve element adjustable into sealing relation with said seat disposed below a diaphragm within said body, a fixture within said body engaging said diaphragm and having a central aperture, a plunger within said aperture in position to have one end engage said diaphragm and having an aperture in its opposite end, a cam engaging plate having a boss projecting into said aperture and having shims thereabout which space the cam engaging plate from said plunger to accurately adjust the overall length thereof, and means for supporting a cam on said fixture in engagement with said cam engaging plate.

2. The combination with a valve having a main valve body containing a seat and a valve element adjustable into sealing relation with said seat disposed below a diaphragm within said body, a fixture within said body engaging said diaphragm and having a central aperture, a plunger within said aperture in position to have one end engage said diaphragm and having an aperture in the opposite end, a cam engaging plate having a boss projecting into said aperture and having shims thereabout which space the cam engaging plate from said plunger to accurately adjust the overall length thereof, a cap extending over a portion of said fixture containing setscrews by which said cap is secured in fixed position thereto, spaced standards extending upwardly from said cap, and a cam plate pivoted to said standards in position to engage said cam engaging plate.

CARL R. FOSBENDER.

REFERENCES CITED

The following references are of record in the file of this patent:

UNITED STATES PATENTS

| Number | Name | Date |
|---|---|---|
| 657,107 | Hannifin | Sept. 4, 1900 |
| 1,490,727 | Billows | Apr. 15, 1924 |
| 1,895,476 | McCune | Jan. 31, 1933 |
| 2,035,202 | Smith | Mar. 24, 1936 |
| 2,094,222 | Smith | Sept. 28, 1937 |
| 2,144,754 | Forbes | Jan. 24, 1939 |
| 2,201,065 | Toolan | May 14, 1940 |
| 2,211,167 | Safford | Aug. 13, 1940 |
| 2,271,785 | Watkins | Feb. 3, 1942 |
| 2,372,392 | Pletman | Mar. 27, 1945 |